United States Patent
Manabe

(10) Patent No.: US 8,935,441 B2
(45) Date of Patent: Jan. 13, 2015

(54) USB 3.0 DEVICE AND CONTROL METHOD THEREOF

(71) Applicant: Renesas Electronics Corporation, Kawasaki-shi (JP)

(72) Inventor: Masao Manabe, Kawasaki (JP)

(73) Assignee: Renesas Electronics Corporation, Kawasaki-Shi, Kanagawa (JP)

( * ) Notice: Subject to any disclaimer, the term of this patent is extended or adjusted under 35 U.S.C. 154(b) by 0 days.

(21) Appl. No.: 14/324,715

(22) Filed: Jul. 7, 2014

(65) Prior Publication Data

US 2014/0325097 A1 Oct. 30, 2014

Related U.S. Application Data

(63) Continuation of application No. 13/742,045, filed on Jan. 15, 2013, now Pat. No. 8,775,692.

(30) Foreign Application Priority Data

Jan. 16, 2012 (JP) .................................. 2012-005894
Sep. 19, 2012 (JP) .................................. 2012-205504

(51) Int. Cl.
*G06F 3/00* (2006.01)
*G06F 11/30* (2006.01)
*G06F 13/00* (2006.01)

(52) U.S. Cl.
CPC .................................. *G06F 11/3051* (2013.01)
USPC ............ 710/16; 710/2; 710/5; 710/8; 710/11; 710/15

(58) Field of Classification Search
None
See application file for complete search history.

(56) References Cited

U.S. PATENT DOCUMENTS

2013/0254440 A1* 9/2013 Toivanen et al. ................. 710/63
2013/0262731 A1* 10/2013 Ranganathan et al. ....... 710/305

OTHER PUBLICATIONS

Universal Serial Bus 3.0 Specification, Hewlett-Packard Company, Intel Corporation, Microsoft Corporation, NEC Corporation, ST-NXP Wireless, Texas Instruments, Revision 1.0, Nov. 12, 2008.

* cited by examiner

*Primary Examiner* — Scott Sun
(74) *Attorney, Agent, or Firm* — McGinn IP Law Group, PLLC

(57) ABSTRACT

A control method for a USB 3.0 (USB: Universal Serial Bus) device includes controlling the USB 3.0 device that has entered an SS.Disabled state to transition to an Rx.Detect state when a USB 2.0 connection is not established with a USB host even after a predetermined time, the USB 2.0 connection including any one of an HS (High Speed) connection, an FS (Full Speed) connection, and an LS (Low Speed) connection.

9 Claims, 20 Drawing Sheets

CONNECTION WITH USB 2.0 HOST

| | TIME TAKEN FOR USB 2.0 CONNECTION ESTABLISHMENT |
|---|---|
| RELATED ART USB 3.0 DEVICE | SAME |
| USB 3.0 DEVICE 120 | |

Fig. 8

CONNECTION WITH USB 3.0 HOST
(WITH NO ERROR)

| | TIME TAKEN FOR SS CONNECTION ESTABLISHMENT |
|---|---|
| RELATED ART USB 3.0 DEVICE | SAME |
| USB 3.0 DEVICE 120 | |

Fig. 9

CONNECTION WITH USB 3.0 HOST
(WITH ERROR)

| | TIME TAKEN FOR TRANSITION TO SS.Disabled STATE | TIME TAKEN FOR RETURN TO Rx.Detect STATE | TIME TAKEN FOR SS CONNECTION ESTABLISHMENT |
|---|---|---|---|
| RELATED ART USB 3.0 DEVICE | SAME | LONG | LONG |
| USB 3.0 DEVICE 120 | | SHORT | SHORT |

Fig. 10

CONNECTION WITH USB 2.0 HOST

| | TIME TAKEN FOR USB 2.0 CONNECTION ESTABLISHMENT |
|---|---|
| RELATED ART USB 3.0 DEVICE | SAME |
| USB 3.0 DEVICE 120 | |
| ANOTHER USB 3.0 DEVICE | LONG |

Fig. 14

CONNECTION WITH USB 3.0 HOST
(WITH NO ERROR)

| | TIME TAKEN FOR SS CONNECTION ESTABLISHMENT |
|---|---|
| RELATED ART USB 3.0 DEVICE | SAME |
| USB 3.0 DEVICE 120 | |
| ANOTHER USB 3.0 DEVICE | |

Fig. 15

CONNECTION WITH USB 3.0 HOST
(WITH ERROR)

| | TIME TAKEN FOR TRANSITION TO SS.Disabled STATE | TIME TAKEN FOR RETURN TO Rx.Detect STATE | TIME TAKEN FOR SS CONNECTION ESTABLISHMENT |
|---|---|---|---|
| RELATED ART USB 3.0 DEVICE | SAME | LONG | LONG |
| USB 3.0 DEVICE 120 | | SHORT | SHORT |
| ANOTHER USB 3.0 DEVICE | | | SHORT |

Fig. 16

USB 3.0 DEVICE AND CONTROL METHOD THEREOF

CROSS-REFERENCE TO RELATED APPLICATIONS

The present application is a Continuation Application of U.S. patent application Ser. No. 13/742,045, filed on Jan. 15, 2013, which is based on and claims priority from Japanese Patent Application No. 2012-005894, filed on Jan. 16, 2012, and Japanese Patent Application No. 2012-205504, filed on Sep. 19, 2012, the entire contents of which is incorporated herein by reference.

BACKGROUND

The present invention relates to a USB (Universal Serial Bus) device, and more particularly to a USB 3.0 device.

USB 3.0 that provides backward compatibility with USB 2.0 includes SuperSpeed (SS) enabling superspeed transmission at 5 Gbps in addition to low-speed (LS), full-speed (FS), and high-speed (HS) in USB 2.0.

In order to realize SS communication, various ideas are incorporated in USB 3.0. For example, since attenuation in UTP (Unshielded Twist Pair) cables that are used in USB 2.0 is too high for SS communication, USB 3.0 further includes two pairs of SDP (Shielded Differential Pair) cables as communication lines supporting SS in addition to the UTP cables complying with the USB 2.0 for USB 2.0 communication.

Moreover, as shown in FIG. 17 (FIG. 10-3 in Universal Serial Bus 3.0 Specification Revision 1.0 (Nov. 12, 2008)), the circuit blocks of USB 3.0 apparatuses (host, hub, and device) further include blocks for SS (SuperSpeed portions) separately from blocks of USB 2.0 (Non-SuperSpeed portions). Note that in the explanation of this specification, the "USB apparatus" indicates both a USB host and a USB device, and also includes a USB hub. The USB hub has a function of both USB host and USB device, being the USB device for the USB host and the USB host for the USB device.

SS USB 3.0 having a different physical layer from USB 2.0 inherits many parts of a higher protocol layer from USB 2.0 in order to fully utilize the resources of USB 2.0 and uses existing class drivers in an application layer. In order to resolve a gap between the physical layer that is different from USB 2.0 and the protocol layer with no significant change from USB 2.0, USB 3.0 further includes a link layer in charge of packet framing, link establishment, and power management.

FIG. 18 is a hierarchical model diagram of a USB 3.0 apparatus. As shown in FIG. 18, a USB 3.0 apparatus 10 includes an SS portion 30 that is added in USB 3.0, a USB 2.0 portion 40, and a common portion 20 that is commonly used by the SS portion 30 and the USB 2.0 portion 40. The USB 2.0 portion 40 includes a USB 2.0 endpoint controller 42, a UTMI (USB 2.0 Transceiver Macrocell Interface) 44, and an HS/FS/LS physical layer 46. The SS portion 30 includes an HS/FS/LS endpoint controller 32, a link layer 34, and an SS physical layer 36. Note that USB 3.0 specifies provision of support for at least one of LS, FS, and HS in USB 3.0 and do not allow support for only SS and not supporting any of LS/FS/HS.

The link layer 34 in FIG. 18 is added to realize SS in USB 3.0. Some states are defined in the link layer of SS and transition conditions of the states are specified. Relevant parts to the present invention are explained with reference to FIG. 19.

FIG. 19 is FIG. 7-13 in Universal Serial Bus 3.0 Specification Revision 1.0 (Nov. 12, 2008), and indicates LTSSM (Link Training and Status State Machine) state transitions in USB 3.0.

An Rx.Detect state in FIG. 19 is a state to detect the presence of a link partner. In the Rx.Detect state, the USB 3.0 apparatus performs a process called "Receiver Detection", and detects presence of a teimination resistance called "Rx.Termination" in transceiver lines for SS. The mechanism of the Receiver Detection is explained with reference to FIGS. 20 and 21.

FIGS. 20 and 21 respectively illustrate cases where the abovementioned termination resistance (i.e., Rx.Termination, which is R_Term 60 in the drawing) is not present in the transceiver lines for SS and the case where the termination resistance is present in the transceiver lines for SS.

A transmission unit in a USB 3.0 apparatus which performs the Receiver Detection is an SS transmission line for the USB 3.0 apparatus and turns on a switch provided on a communication line, which is an SS reception line for a destination USB 3.0, in order to apply voltage (SW control voltage in the drawings) to the communication line. A reception unit is an SS reception line for the source USB 3.0 and connects the R_Term 60 provided on a communication line, which is an SS transmission line for the destination USB 3.0 apparatus.

After the switch 50 turns on, the source USB 3.0 apparatus monitors changes in voltage (V_Detect) of the SS transmission line and detects the presence of the R_Term 60 from the changes in the V_Detect. Below is an explanation with reference to FIG. 22.

The SW control voltage applied to the SS transmission line during the Receiver Detection is shown in the upper part of FIG. 22. When the destination USB apparatus supports SS and is in the Rx.Detect state (the state shown in FIG. 21, i.e., the R_Term 60 is connected), the V_Detect gradually increases as indicated by a curved line C2 in the drawing. On the other hand, when the destination USB apparatus does not support SS or support SS but the R_Term 60 is not connected (the state shown in FIG. 20), the V_Detect rapidly increases as indicated by a curved line C1 in the drawing.

The source USB 3.0 apparatus samples the V_Detect with threshold voltage called Vthreshold and detect the presence of the R_Term 60 from the sampled result. Note that USB 3.0 specifies that this detection is performed up to eight times.

Turning back to FIG. 19, the explanation will be continued further. In the Rx.Detect state, when the R_Term 60 is detected within eight times, LTSSM will transition to a Polling state. The operations so far are same whether the source USB 3.0 apparatus is a USB 3.0 host or a USB 3.0 device.

In the Rx.Detect state, when the R_Term 60 is not detected within eight times of detection, the subsequent operations are different for the USB 3.0 host and the USB 3.0 device.

When the source USB 3.0 apparatus is the USB 3.0 host, the host returns to the Rx.Detect state upon an instruction to resume the Receiver Detection from an upper layer (driver and the like) of the link layer. When there is no resume instruction from the upper layer, upon detection of pull-up of D+ or D−, the host performs USB 2.0 Bus Reset (hereinafter may be also referred to as merely "Bus Reset"), attempts a USB 2.0 connection with the destination (device), and further detects the R_Term 60. Although USB 3.0 does not limit the number of executing Bus Reset by the host, USB 3.0 specifies that detection of the R_Term 60, i.e., the Receiver Detection is performed only once per Bus Reset. When the R_Term 60 is detected in one Receiver Detection, LTSSM transitions to the Polling state and the link procedure in SS is performed.

On the other hand, when the R_Term 60 is not detected in this detection, the host continues the USB 2.0 connection with the destination.

When the source is the USB 3.0 device and the R_Term 60 is not detected within eight times of detection, the device enters an SS.Disabled state.

As shown in FIG. 19, the USB 3.0 device in the SS.Disabled state will not return to the Rx.Detect state without PowerOn Reset or the USB 2.0 Bus Reset.

When the USB 3.0 device enters the SS.Disabled state, the USB 3.0 activates the USB 2.0 portion 40 (see FIG. 18) in the USB 3.0 device and is prepared for a USB 2.0 connection with the destination (host in this example). In parallel with this, upon the USB 2.0 Bus Reset by the USB 3.0 host, the USB 3.0 device returns to the Rx.Detect state and performs the Receiver Detection again. USB 3.0 specifies that also for the device, the Receiver Detection here is performed only once per Bus Reset. When the R_Term 60 is detected by this Receiver Detection, the USB 3.0 device transitions to the Polling state and will perform the link procedure in SS.

In the following explanation, only one Receiver Detection along with Bus Reset shall be referred to as "Bus Reset Receiver Detection" for the sake of convenience.

SUMMARY

Incidentally, when the USB 3.0 device enters the SS.Disabled state due to a certain error in the USB 3.0 host, the USB 3.0 host attempts to detect the R_Term 60 for eight times and then executes the USB 2.0 Bus Reset after recovering from the error even if the R_Term 60 cannot be detected by the Receiver Detection performed to the USB 3.0 device in the SS.Disabled state. The present inventor has found a problem that the eight times of detection for the R_Term 60 are in vain, and it takes time for the US 3.0 device to return from SS.Disabled to the Rx.Detect state.

An aspect of the present invention is a control method for a USB 3.0 (USB: Universal Serial Bus) device. The control method controls the USB 3.0 device that has entered an the SS.Disabled state to transition to an the Rx.Detect state when a USB 2.0 connection is not established with a host even after a predetermined time, in which the USB 2.0 connection is any one of an HS (High Speed) connection, an FS (Full Speed) connection, and an LS (Low Speed) connection.

Note that application of the above aspect of the method to an apparatus, an USB device including the apparatus, and a program that causes a computer to execute the method are also effective as the aspect of the present invention.

The technique according to the present invention enables the USB 3.0 device which entered the SS.Disabled state due to an error in the host to quickly return to the Rx.Detect state.

BRIEF DESCRIPTION OF THE DRAWINGS

The above and other aspects, advantages and features will be more apparent from the following description of certain embodiments taken in conjunction with the accompanying drawings, in which:

FIG. 8 shows a comparison between the USB 3.0 device shown in FIG. 2 and the USB 3.0 device according to the related art (4);

FIG. 9 shows a comparison between the USB 3.0 device shown in FIG. 2 and the USB 3.0 device according to the related art (5);

FIG. 10 shows a comparison between the USB 3.0 device shown in FIG. 2 and the USB 3.0 device according to the related art (6);

FIG. 14 shows a comparison with the another USB 3.0 device (4);

FIG. 15 shows a comparison with the another USB 3.0 device (5);

FIG. 16 shows a comparison with the another USB 3.0 device (6);

DETAILED DESCRIPTION

Figure 1:
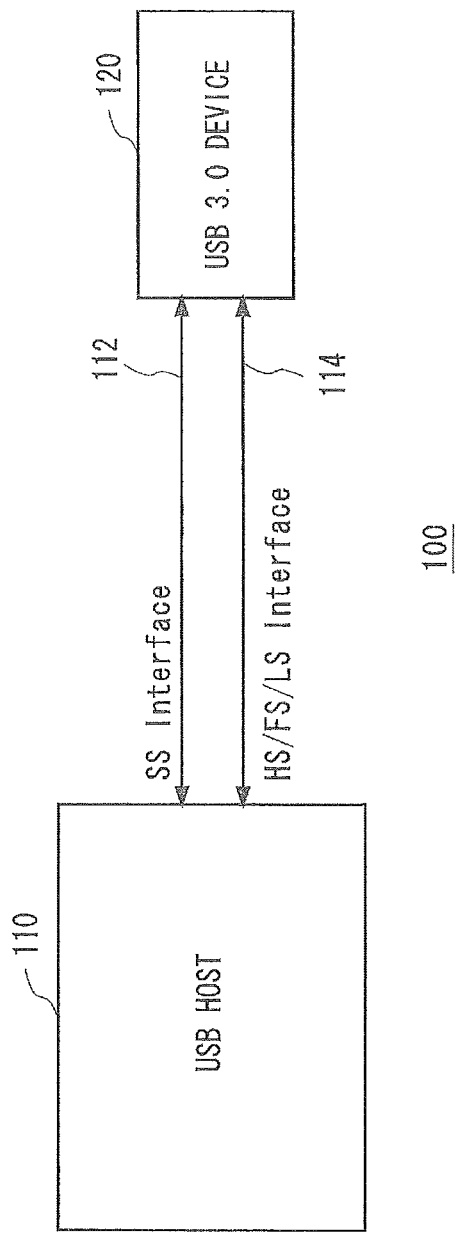
FIG. 1 shows a USB system according to an embodiment of the present invention.

Hereinafter, an embodiment of the present invention is explained with reference to the drawings. Following description and drawings are omitted and simplified as appropriate for the clarity of explanation. Moreover, each element in the drawings illustrated as functional blocks for performing various processes can be composed of a CPU, memory, and other circuits as hardware and realized by programs loaded into a memory as software. Therefore, those skilled in the art would understand that these functional blocks can be realized only by hardware, software, or a combination thereof, and it is not limited to any of them. Note that the same elements are denoted by the same reference numerals in the drawings, and explanation will not be repeated as necessary.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

FIG. 1 shows a USB system 100 according to the embodiment of the present invention. This USB system 100 includes a USB host 110 and a USB 3.0 device 120. The USB host 110 and the USB 3.0 device 120 are connected by an SS Interface 112 and an HS/FS/LS Interface 114.

Figure 2:
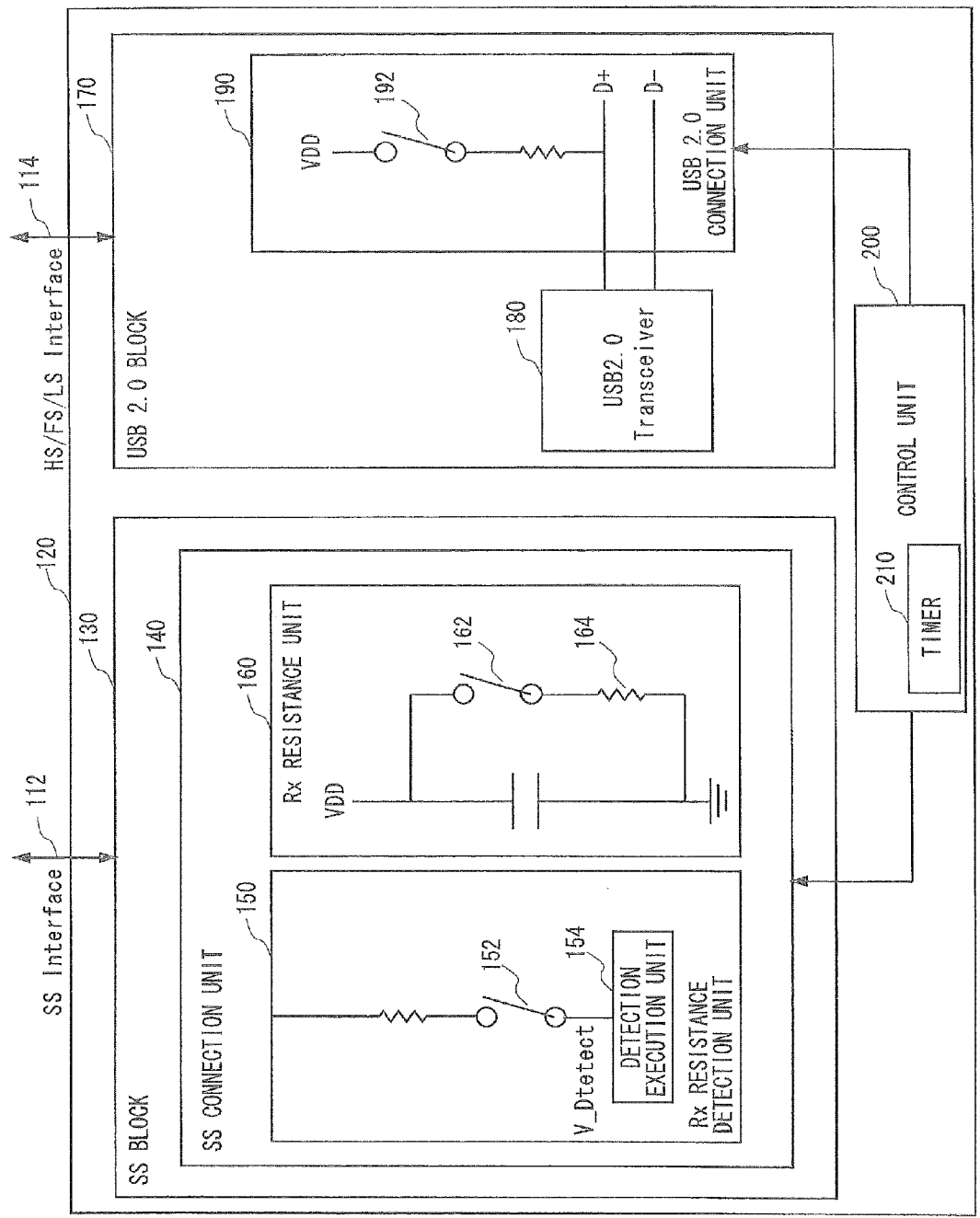
FIG. 2 shows a USB 3.0 device in the USB system shown in FIG. 1.

FIG. 2 shows the USB 3.0 device 120. For the sake of clarity, FIG. 2 illustrates only the functional blocks necessary for explaining features of the USB 3.0 device 120, and other functional blocks included in a common USB 2.0 device are not shown.

As shown in FIG. 2, the USB 3.0 device 120 includes an SS block 130 and a USB 2.0 block 170, and a control unit 200.

The control unit 200 controls switching between the Rx.Detect state and the SS.Disabled state of the USB 3.0 device 120. The control operation after the USB 2.0 device 120 enters the SS.Disabled state is different in the control unit 200 from the corresponding functional block in the common USB 2.0 device. This is explained later.

The SS block 130 is similar to the block that performs processes relating to SS communication in the common USB 3.0 device and includes an SS connection unit 140 for performing a connection procedure for an SS connection. The SS connection unit 140 includes an Rx resistance detection unit 150 and an Rx resistance unit 160. The Rx resistance detection unit 150 includes a switch 152 and a detection execution unit 154, and Rx resistance unit 160 includes a switch 162 and a Receiver Detection (hereinafter referred to as "R_Term") 164.

The SS connection unit 140 performs the Receiver Detection in the Rx.Detect state. At that time, while the switch 152 turns on in the Rx resistance detection unit 150, the detection execution unit 154 monitors changes in voltage V_Detect and detect presence of Rx.Termination (R_Term) on the USB host 110 side. Moreover, in the Rx resistance unit 160, when the switch 162 turns on, the R_Term 164 is connected.

The SS connection unit 140 detects the R_Term in the USB host 110 during the Receiver Detection for the maximum of eight times at intervals of 12 ms. When the SS connection unit 140 was unable to detect the R_Term within eight times of detection, the control unit 200 turns off the switches 152 and 162 to stop an operation of the SS connection unit 140 in order to transition to the SS.Disabled state.

The USB 2.0 blocks 170 is similar to the block that performs the processes relating to the communication in USB 2.0 in the common USB 2.0 device and includes a USB 2.0 reception unit 180 and a USB 2.0 connection unit 190 that performs a connection procedure for a USB 2.0 connection. Note that the USB 2.0 connection is one of an HS connection, an FS connection, and an LS connection defined by USB 2.0, and the USB 3.0 device is specified to support at least one of the three connections. Further note that the USB 2.0 connection unit 190 includes a switch 192. The USB 2.0 connection unit 190 is assumed to perform the HS/FS connection, and thus a pull-up resistor controlled by the switch 192 is connected to a D+ line. When the USB 2.0 connection unit makes the LS connection, the pull-up resistor and the switch 192 are connected to a D− line.

When the Receiver Detection performed by the SS connection unit 140 fails, the USB 2.0 device 120 transitions to the SS.Disabled state. When the USB 3.0 device 120 transitioned to the SS.Disabled state, the control unit 200 controls the USB 2.0 connection unit 190 to start the connection procedure for the USB 2.0 connection.

At the time of starting the connection procedure for the USB 2.0 connection by the USB 2.0 connection unit 190, the USB 2.0 connection unit 190 pulls up D+ between two differential signal lines (D+ and D−) of the USB 2.0 reception unit 180 in the case of the HS or FS connection (hereinafter referred to as HS/FS connection). After that, the USB 2.0 connection unit 190 waits for a USB 2.0 connection operation from the host side.

In the USB 2.0 connection operation, firstly the host side detects whether either one of D+ and D− of the USB 2.0 reception unit 180 in the USB 3.0 device 120 is pulled up. When D+ is pulled up, the host side chirps via the USB 2.0 Bus Request to evaluate whether the connection is the HS or FS connection, and establishes a corresponding connection. On the other hand, when D− of the USB 2.0 reception unit 180 is pulled up, the host side performs the USB 2.0 Bus Reset and establishes the LS connection.

Note that when the USB host 110 is a USB 3.0 host, while the USB host 110 executes the USB 2.0 Bus Reset, the USB host 110 controls the USB 3.0 device to return to the Rx.Detect state in an attempt for establishing another SS connection. In this case, the control unit 200 controls the SS connection unit 140 to perform the Receiver Detection and the like. As mentioned above, in the USB 3.0, the Receiver Detection here is the Bus Reset Receiver Detection, and it is specified that the Receiver Detection is performed only once per Bus Reset both for the host and device sides.

Moreover, in the SS.Disabled state, the USB 3.0 device 120 returns to the Rx.Detect state also in the case of the PowerOn Reset in addition to the US 2.0 Bus Reset. Further, the control unit 200 controls the SS connection unit 140 to perform the Receiver Detection and the like. The Receiver Detection in this case is specified not to be the Bus Reset Receiver Detection and performed for the maximum of eight times.

In the above explanation, the operation of the control unit 200 is similar to that of the corresponding functional block in the common USB 3.0 device. In the USB system 100 of this embodiment, the control unit 200 performs the following control operation when the USB 3.0 device 120 enters the SS.Disabled state in addition to the above operations.

As shown in FIG. 2, the control unit 200 includes a timer 210. The timer 210 starts counting the time from when the USB 3.0 device enters the SS.Disabled state.

When the PowerOn Reset is generated before the time counted by the timer 210 reaches a predetermined time T (for example, several ms), the control unit 200 controls the timer 210 to stop counting the time and the USB 2.0 connection unit 190 to stop operating and also controls the SS connection unit 140 to resume the Receiver Detection. That is, the USB 3.0 device 120 returns to the Rx.Detect state. After that, the Receiver Detection is performed for the maximum of eight times.

Further, when the USB 2.0 Bus Reset is generated before the time counted by the timer 210 reaches the predetermined time T (for example, several ms), the control unit 200 controls the SS connection unit 140 to resume the Receiver Detection while controlling the timer 210 to continue counting the time and the USB 2.0 connection unit 190 to continue the operation. That is, the USB 3.0 device 120 returns to the Rx.Detect state. Note that as the Receiver Detection resumed at this time is the Bus Reset Receiver Detection according to the Bus Reset, the Receiver Detection is performed only once, as described above.

Furthermore, when the USB 2.0 connection is established before the time counted by the timer 210 reaches the above predetermined time T, the USB 2.0 block 170 operates and the control unit 200 controls the USB 3.0 device 120 not to transition from the SS.Disabled state to the Rx.Detect state.

On the other hand, when the time counted by the timer 210 reaches the time T while both of the PowerOn Reset and the USB 2.0 Bus Reset are not generated and the USB 2.0 connection is not established, the control unit 200 controls the USB 2.0 connection unit 190 to stop operating and also controls the SS connection unit 140 to start the Receiver Detection, so that the USB 3.0 device 120 transitions from the SS.Disabled state to the Rx.Detect state. Specifically, the control unit 200 returns pulled-up D+ or D− of the USB 2.0 reception unit 180, and turns on the switch 152 in the Rx resistance detection unit 150 and the switch 162 in the Rx resistance unit 160.

Figure 3:
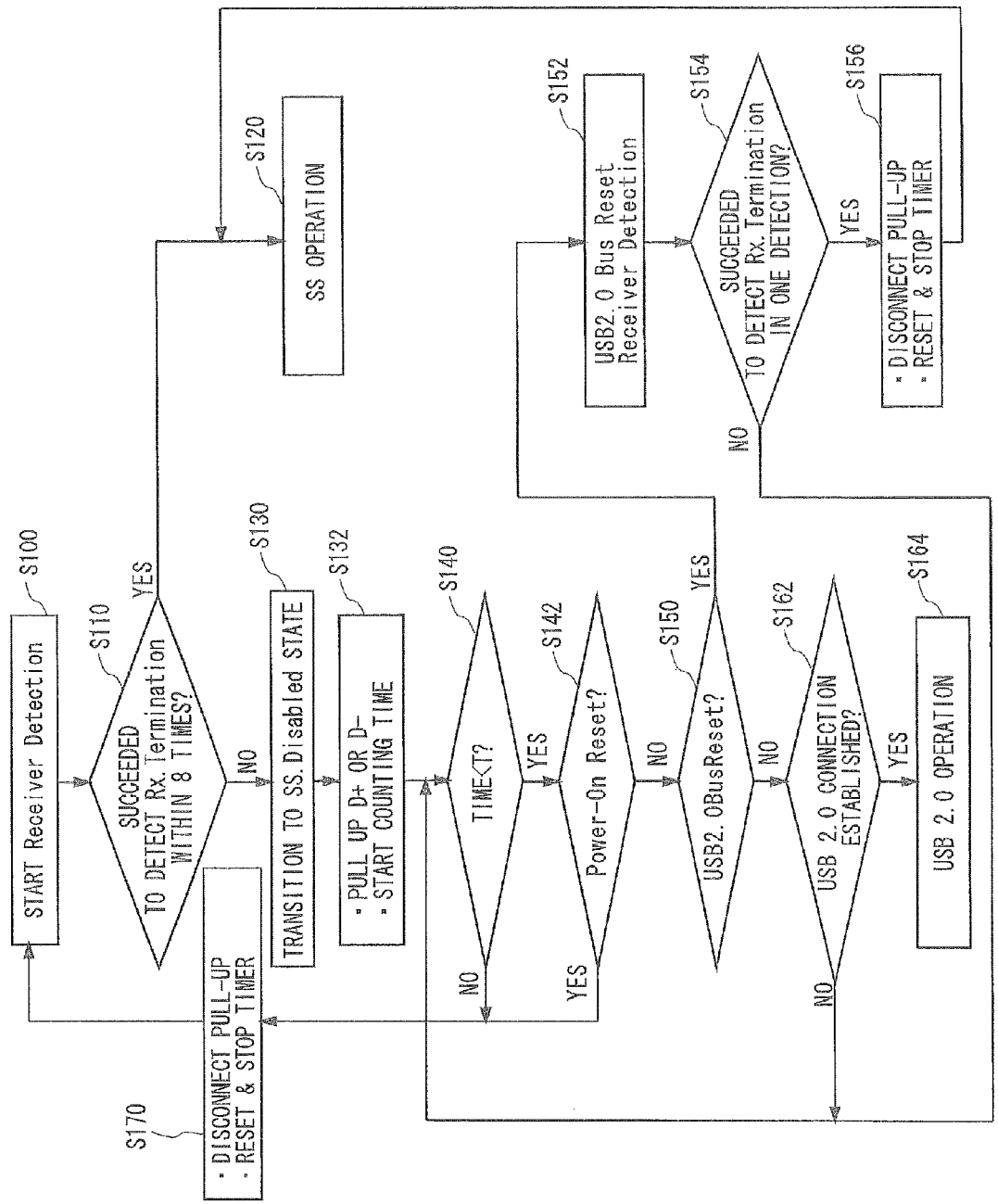
FIG. 3 is a flowchart showing an operation of the USB 3.0 device shown in FIG. 2.
Figure 4:
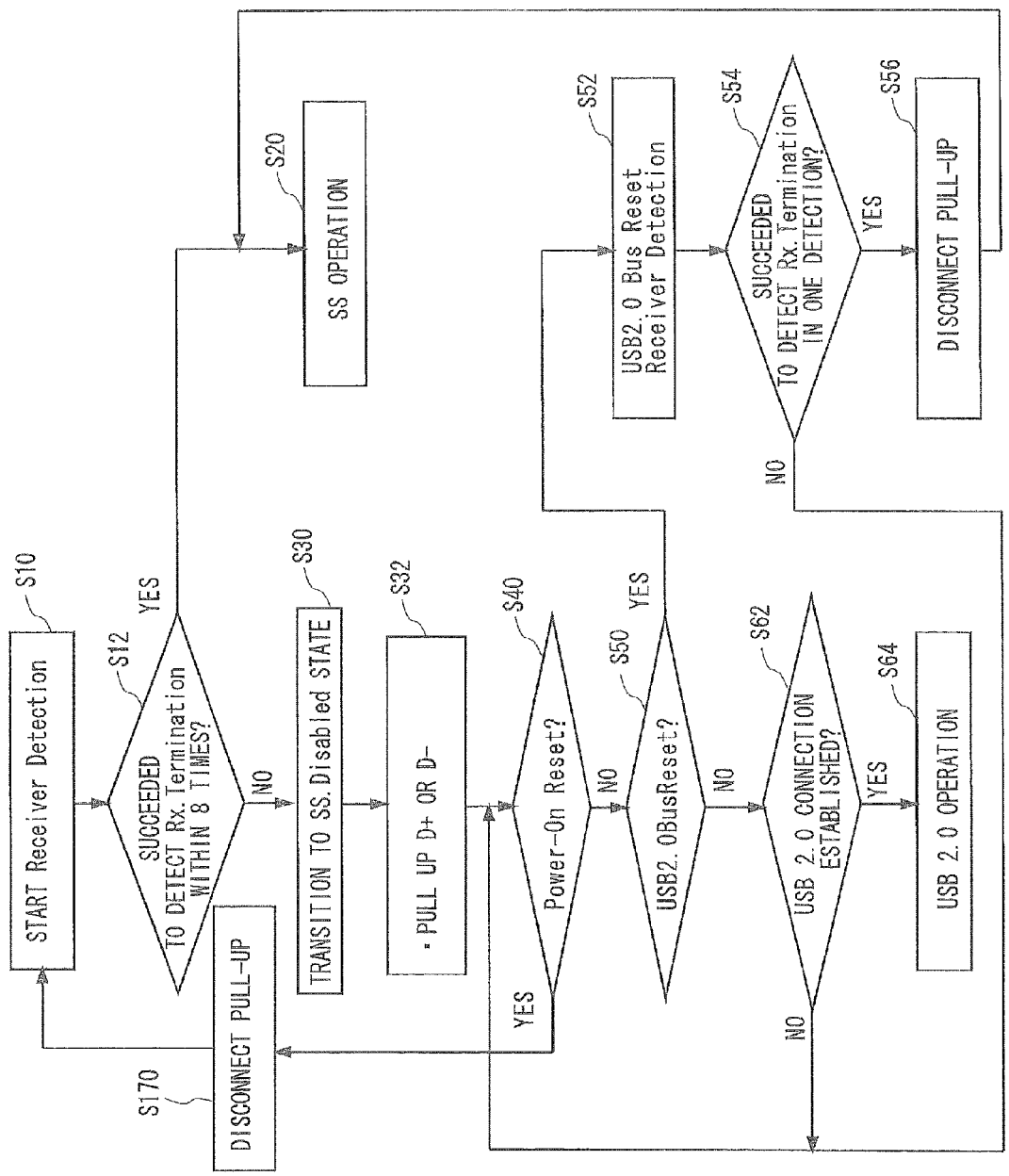
FIG. 4 is a flowchart showing an operation of a USB device 3.0 according to a related art.

With the control unit 200 included therein, the USB 3.0 device 120 operates as in the flowchart of FIG. 3. FIG. 4 shows the operation of the USB 3.0 device according to the related art for comparison.

As shown in FIG. 3, the USB 3.0 device 120 starts the Receiver Detection in the Rx.Detect state, and when the USB 3.0 device 120 detects the Rx.Termination within eight times of detection, the USB device 3.0 120 moves to the SS operation such as transitioning to Polling (S100, S110: Yes, and S120).

Meanwhile, when the USB 3.0 device 120 was unable to detect the Rx.Termination within eight times of the Rx.Termination detection (S110 and S110: No), the USB 3.0 device 120 transitions to the SS.Disabled state (S130) and pulls up D+ or D− of the USB 2.0 reception unit 180, and also the timer 210 starts counting the time and the USB 3.0 device 120 waits for an establishment of the USB 2.0 connection with the USB host 110 (S132).

When the PowerOn Reset is generated before the time counted by the timer 210 reaches the time T (S140: Yes and S142: Yes), the USB 3.0 device 120 transitions to the Rx.Detect state and performs the Receiver detection (from S100). At the same time, the pull-up formed in the step S130 is disconnected, the timer 210 is reset, and the counting operation stops (S170). Note that as mentioned above, the Receiver Detection here can be performed for the maximum of eight times.

When the PowerOn Reset is not generated and the Bus Reset is performed before the time counted by the timer 210 reaches the time T (S140: Yes, S142: No, and S150: Yes), the USB device 120 transitions to the Rx.Detection state and performs the Receiver Detection (S152). As described above, the Receiver Detection here is the Bus Reset Receiver Detection and performed only once.

When the Bus Reset Receiver Detection in the step S152 is successful, the USB 3.0 device 120 moves to the SS operation including disconnecting the pull-up formed in the step S130, resetting the timer 210, and stopping the counting operation, and also transitioning to Polling (S154: Yes, S156, and S120).

Meanwhile, when the Bus Reset Receiver Detection in the step S152 fails, the USB 3.0 device 120 returns to the step S140 (S154: No and S140).

Note that when the USB 2.0 connection is established before the time counted by the timer 210 reaches the time T (S140: Yes, S142: No, S150: No, and S162: Yes), the USB 3.0 device 120 moves to the USB 2.0 operation (S164).

Meanwhile, when the USB 2.0 connection is not established even after the time counted by the timer 210 reaches the time T, the USB 3.0 device 120 transitions to the Rx.Detect state and performs the Receiver Detection (S162: No, S140: No, and S100). At the same time, the pull-up formed in the step S130 is disconnected, the timer 210 is reset, and the counting operation is stopped (S170).

In the example shown in FIG. 3, the Receiver Detection in this case can be executed for the maximum of eight times in a similar manner to the Receiver Detection excluding the Bus Reset Receiver Detection. However, the number to perform the Receiver Detection is not limited to eight but may be any number greater than or equal to one.

See FIG. 4 for the explanation below. As shown in FIG. 4, when the USB 3.0 according to the related art enters the SS.Disabled state after eight times of unsuccessful Receiver Detection (S10, S12: No, S30, and S32), unless the PowerOn Reset and the USB 2.0 Bus Reset are generated (S40: No or S40: Yes and S50: No), the USB 3.0 according to the related art continues to wait for an establishment of the USB 2.0 connection.

On the other hand, when the time T elapses while neither of the USB 2.0 Bus Reset and the PowerOn Reset are generated and the USB 2.0 connection is not established after the transition to the SS.Disabled state, the USB 3.0 device 120 in the USB system 100 of this embodiment transitions to the Rx.Detect state and perform is the Receiver Detection.

Figure 5:
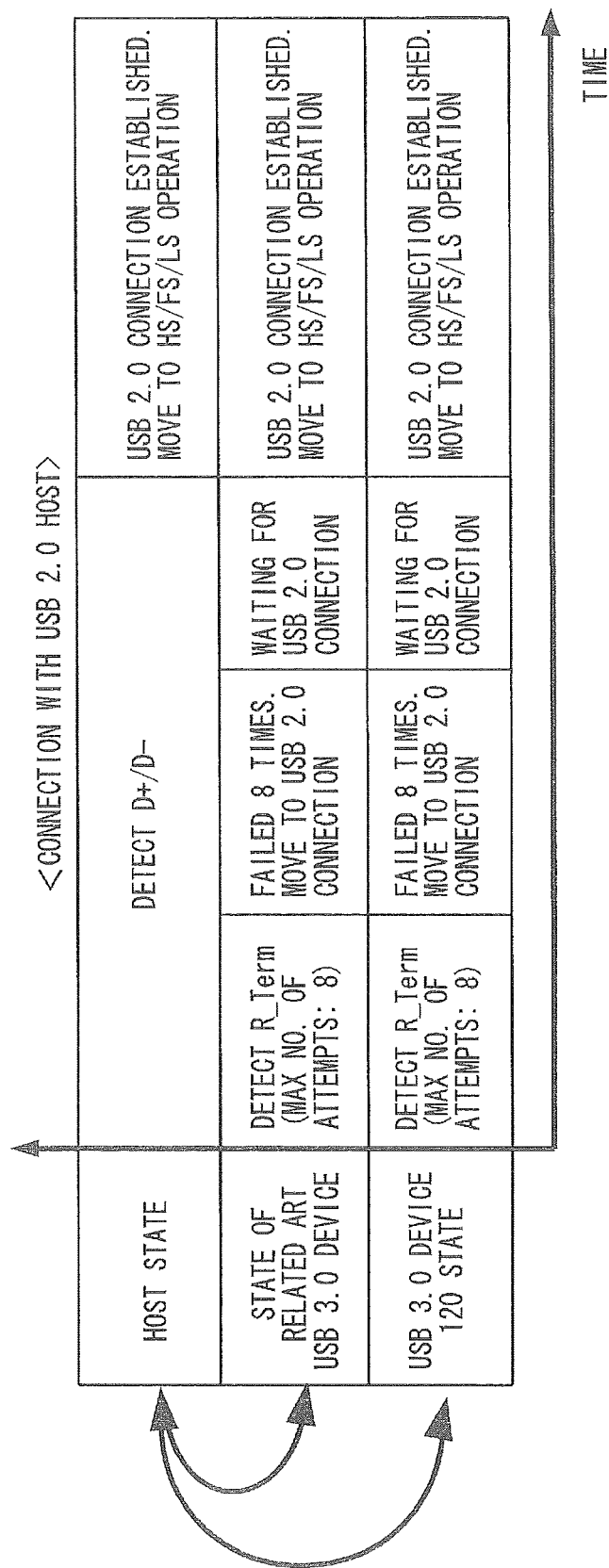
FIG. 5 shows a comparison between the USB 3.0 device shown in FIG. 2 and the USB 3.0 device according to the related art (1)

The advantages produced by such an operation of the USB 3.0 device 120 are explained below. FIG. 5 is a diagram showing operations of the USB 3.0 device 120 and the USB 3.0 device according to the related art when the USB host 110 is USB 2.0.

In this case, both the USB 3.0 device 120 and the USB 3.0 device according to the related art transition from the Rx.Detect state to the SS.Disabled state by eight times of unsuccessful detection of Rx.Termination. Then, the USB 3.0 device according to the related art establishes the USB 2.0 connection in the SS.Disabled state. Also in the case of the USB 3.0 device 120, the corresponding host is the USB 2.0 host and in the state of waiting to detect D+/D−. Thus the USB 2.0 connection is established before the timer 120 reaches the time T. Therefore, as shown in FIG. 5, for both of the USB 3.0 device 120 and the USB 3.0 device according to the related art, the time of establishing the USB 2.0 connection with the host is the same.

Figure 6:
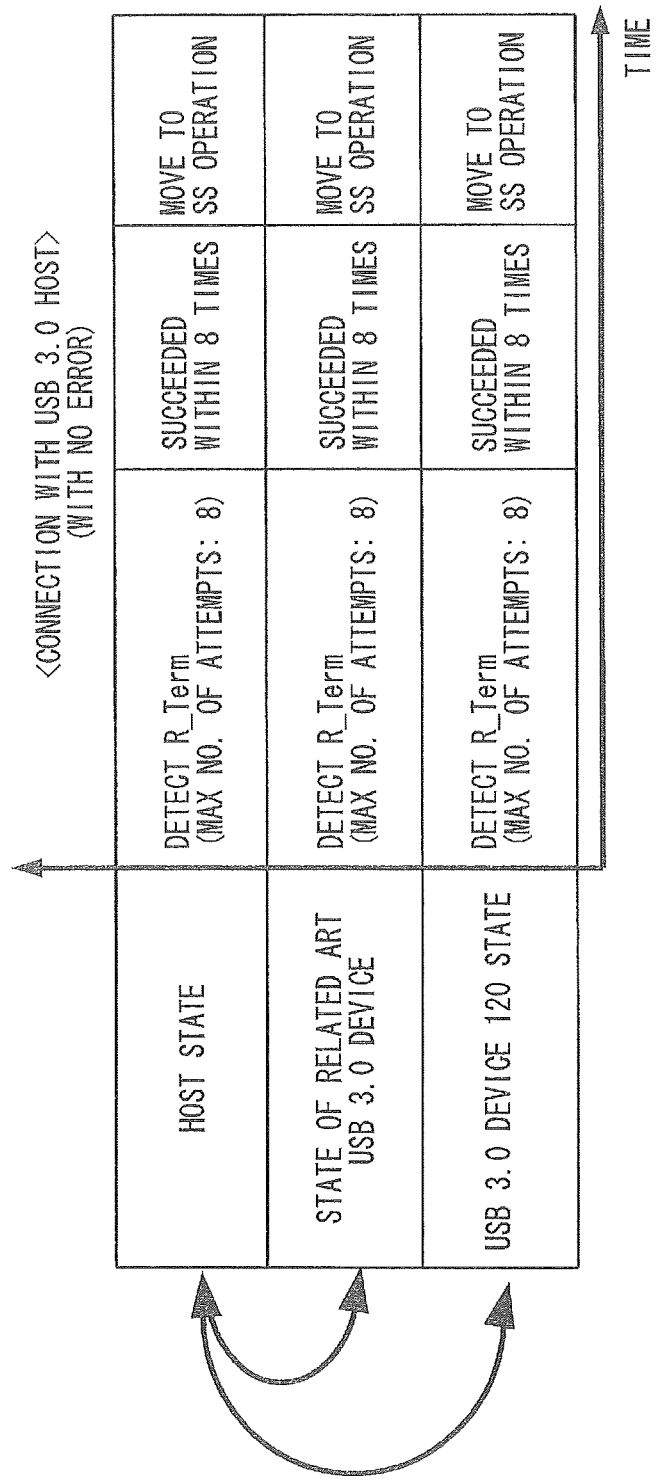
FIG. 6 shows a comparison between the USB 3.0 device shown in FIG. 2 and the USB 3.0 device according to the related art (2)

FIG. 6 is a diagram showing operations of the USB 3.0 device 120 and the USB 3.0 device according to the related art when the USB host 110 is the USB 3.0 host, no error is generated in the USB 3.0 host, and the device and the host detected the Rx.Termination within eight times of the Receiver Detection.

In this case, as shown in the drawing, as the Rx.Termination is detected within eight times of detection, both of the USB 3.0 device 120 and the USB 3.0 device according to the related art move to the SS operation including transitioning from the Rx.Detect state to the Polling state.

Figure 7:
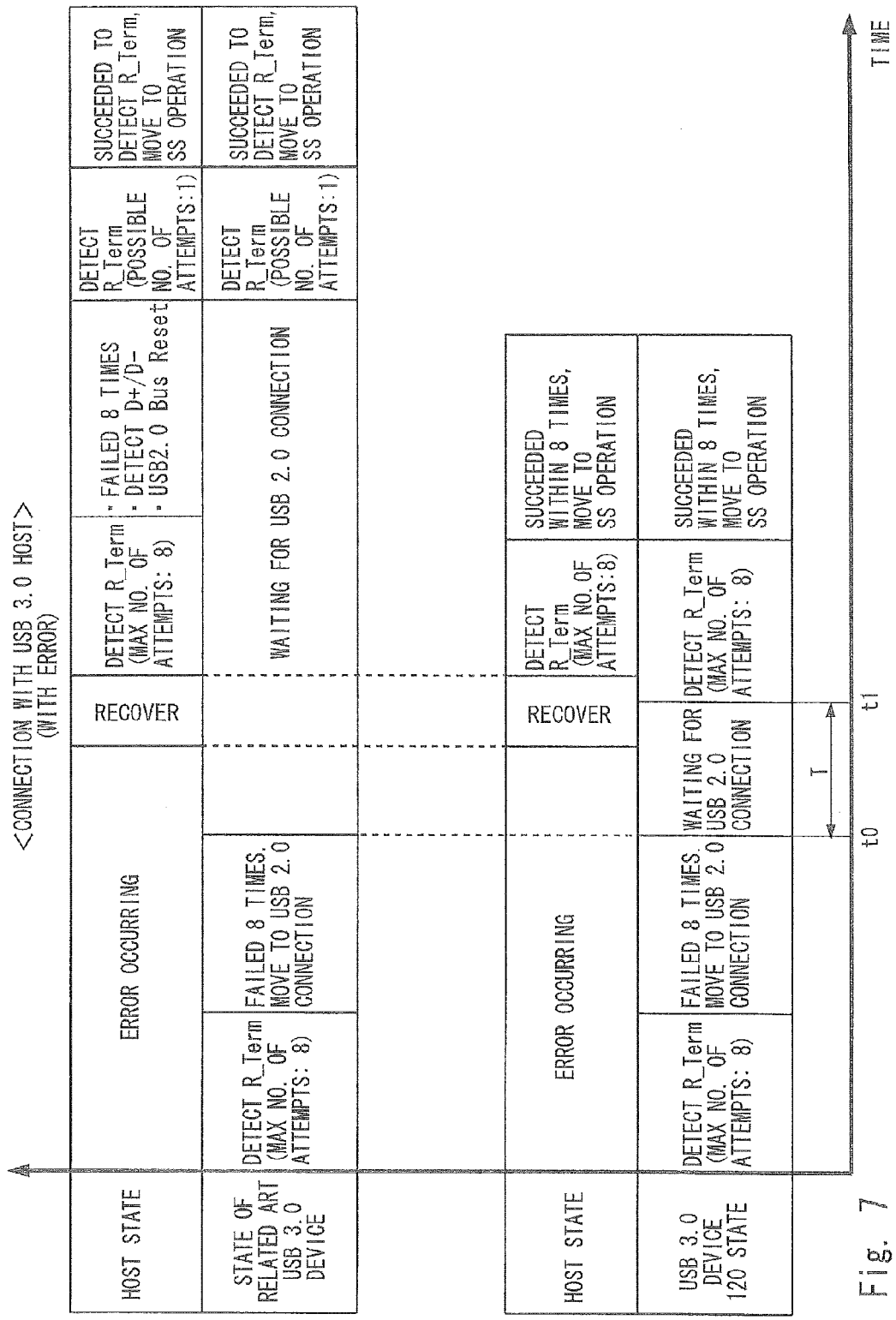
FIG. 7 shows a comparison between the USB 3.0 device shown in FIG. 2 and the USB 3.0 device according to the related art (3)

FIG. 7 is a diagram showing operations of the USB 3.0 device 130 and the USB 3.0 device according to the related art when the USB host 110 is the USB 3.0 host, and after the device transitioned to the SS.Disabled state due to an error in the host during the first Receiver Detection, the device recovered from the error.

In this case, as shown in the drawing, the USB host 110 operates in a similar manner to the USB 3.0 device 120 and the USB 3.0 device according to the related art till the transition to the SS.Disabled state.

After the transition to the SS.Disabled state, the USB 3.0 device according to the related art continues to wait for the USB 2.0 connection until the USB host 110 recovers from the error, performs the Receiver Detection, and executes the USB 2.0 Bus Request after eight times of unsuccessful detection of the Rx.Termination. By the USB 2.0 Bus Reset, the USB 3.0 device according to the related art returns to the Rx.Detect state and performs the Receiver Detection, and both the USB host 110 and the USB 3.0 device according to the related art detect the Rx.Termination and move to the SS operation. Note that as described above, USB 3.0 specifies that the detection of the Receiver Detection in this part can be performed for the maximum of one time.

On the other hand, after the USB 3.0 device 120 transitioned to the SS.Disabled state at the timing t0, the USB 3.0 120 returns to the Rx.Detect state when the time T elapses since the timing t0 (which is the timing t1 in the drawing) while waiting for the USB 2.0 connection. After that, as the USB host 110 returns during the Receiver Detection by the USB 3.0 device 120, both the USB host 110 and the USB 3.0 device according to the related art detect the Rx.Termination and thereby moves to the SS operation. In the example of FIG. 3, the Receiver Detection can be performed for the maximum of eight times both on the host and device sides.

Therefore, as can be seen from FIG. 7, in this case, the USB 3.0 device 120 moves to the SS operation faster than the USB 3.0 device according to the related art.

Explained below is a comparison of the time taken from the start of the Receiver Detection till the establishment of the USB 2.0 or the SS connection between the USB 3.0 device 120 and the USB 3.0 device according to the related art for each case shown in FIGS. 5 to 7.

FIG. 8 corresponds to FIG. 5, showing the time until the USB 2.0 connection is established when the USB host 110 is the USB 2.0 host. As shown in the drawing, in this case, the time until the USB 2.0 connection is established is similar between the USB 3.0 device 120 and the USB 3.0 device according to the related art.

FIG. 9 corresponds to FIG. 6, showing the time until the SS connection is established when the USB host 110 is the USB 3.0 host and an error is not generated during the first Receiver Detection. As shown in the drawing, in this case, time until the SS connection is established is similar between the USB 3.0 device 120 and the USB 3.0 device according to the related art.

FIG. 10 corresponds to FIG. 7, showing the time until the SS connection is established when the USB host 110 is the USB 3.0 host, an error is generated during the first Receiver Detection, and the device recovers from the error after the transition to the SS.Disabled state. As shown in the drawing, in this case, the time till the transition to the SS.Disabled state is similar between the USB 3.0 device 120 and the USB 3.0 device according to the related art.

However, the return from the SS.Disabled state to the Rx.Detect state is faster for the USB 3.0 device 120 than the USB 3.0 device according to the related art. Consequently, in this case, the time taken from the start of the first Receiver Detection till the establishment of the SS connection is shorter for the USB 3.0 device 120.

As has been explained, with the USB 3.0 device 120 of this embodiment, after the transition to the SS.Disabled state, when the USB 2.0 Bus Reset is not executed after the time T elapses, the USB 3.0 device 120 voluntarily returns to the Rx.Detect state. Therefore, the USB 3.0 device 120 returns to the Rx.Detect state early when the first Receiver Detection fails due to an error in the USB host 110, which is the USB 3.0 host, and in consequence, it is more likely to establish the SS connection early.

Moreover, as can be seen from FIGS. 8 and 9, the USB 3.0 device 120 operates in a way defined by USB 3.0 in the case where the USB host 110 is the USB 2.0 host and the case where the USB host 110 is the USB 3.0 host but no error is generated, thereby causing no adverse effect at all.

When the USB 3.0 device was unable to detect the Rx.Termination within eight times due to an error in the USB 3.0 host, in order to detect the Rx.Termination early when the host recovers from the error, the maximum number of the Receiver Detection other than the Bus Reset Receiver Detection can be increased to N times (N: an integer greater than or equal to nine), which is greater than eight times defined by USB 3.0. That is, such a USB 3.0 device is capable of detecting the Rx.Termination up to N times other than the Bus Reset Receiver Detection. Upon unsuccessful detection for N times, the USB 3.0 device transitions to the SS.Disabled state. Hereinafter, such a USB 3.0 device is referred to as "another USB 3.0 device" that is different from the USB 3.0 device 120 and the USB 3.0 device according to the related art.

Figure 11:
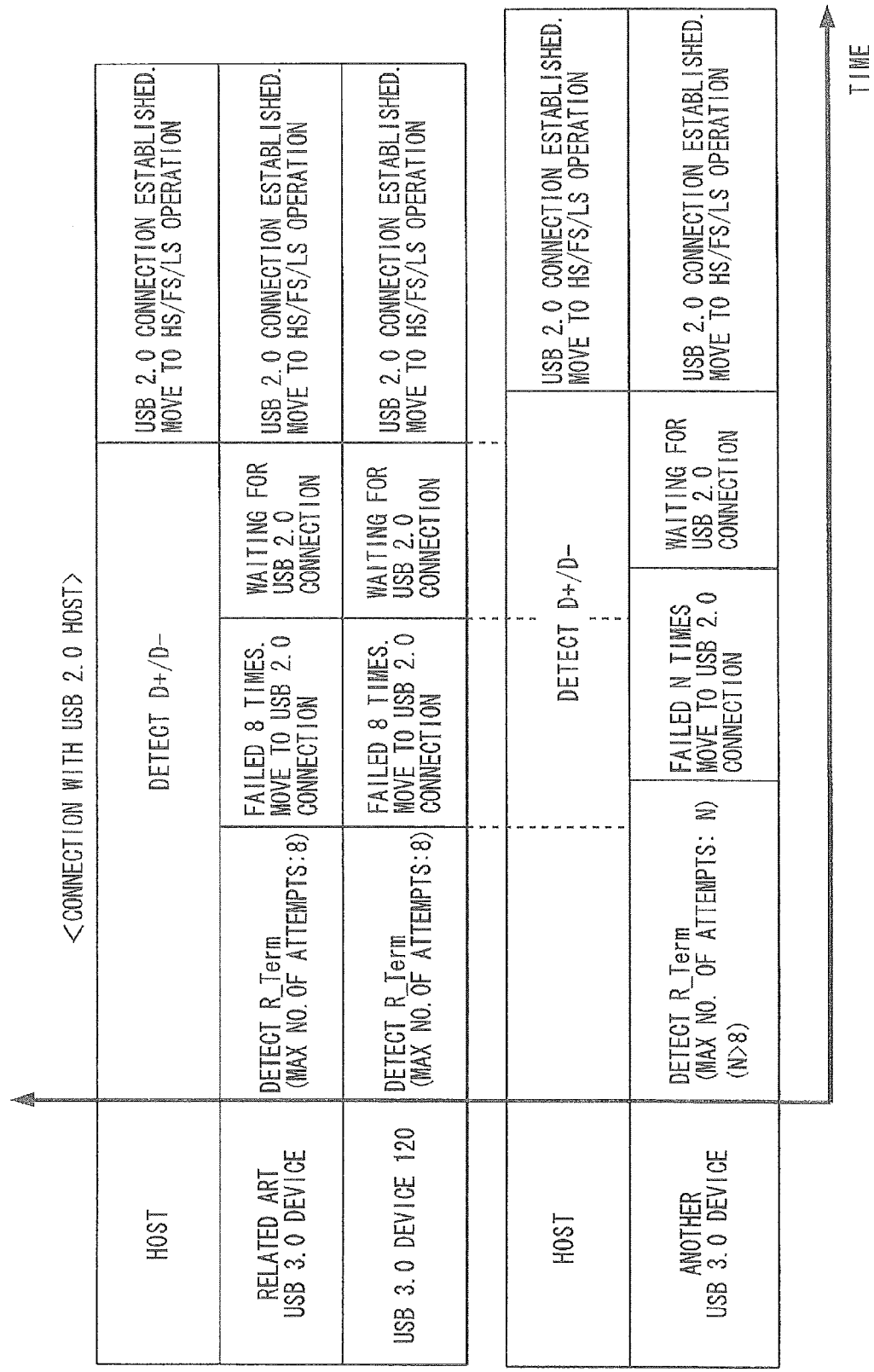
FIG. 11 shows a comparison with another USB 3.0 device (1)

FIG. 11 is a diagram further showing an operation of the another USB 3.0 device in addition to FIG. 5, i.e., FIG. 11 shows operations of the USB 3.0 device 120, the USB 3.0 device according to the related art, and the another USB 3.0 device.

In this case, as shown in the drawing, the another USB 3.0 device transitions to the SS.Disabled state after N times of unsuccessful detection of the Rx.Termination. Thus, the transition to the SS.Disabled state is slower for the another USB 3.0 device than for the USB 3.0 device and the USB 3.0 device according to the related art, thereby delaying the establishment of the USB 2.0 connection in consequence.

Figure 12:
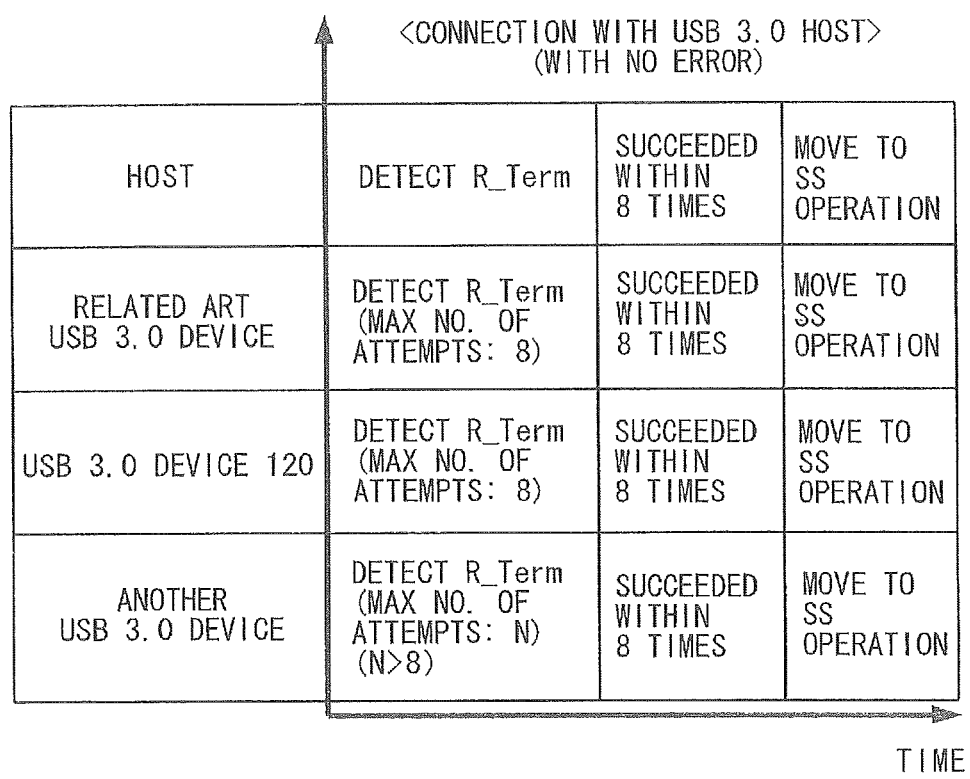
FIG. 12 shows a comparison with the another USB 3.0 device (2)

FIG. 12 is a diagram further showing an operation of the another USB 3.0 device in addition to FIG. 6, i.e., FIG. 12 shows operations of the USB 3.0 device 120, the USB 3.0 device according to the related art, and the another USB 3.0 device when the USB host 110 is the USB 3.0 host and further, no error is generated in the USB 3.0 host, and the device and the host detected the Rx.Termination in the first Receiver Detection, which is within eight times.

In this case, as shown in the drawing, there is no difference in time among the USB 3.0 devices till the establishment of the SS connection.

Figure 13:
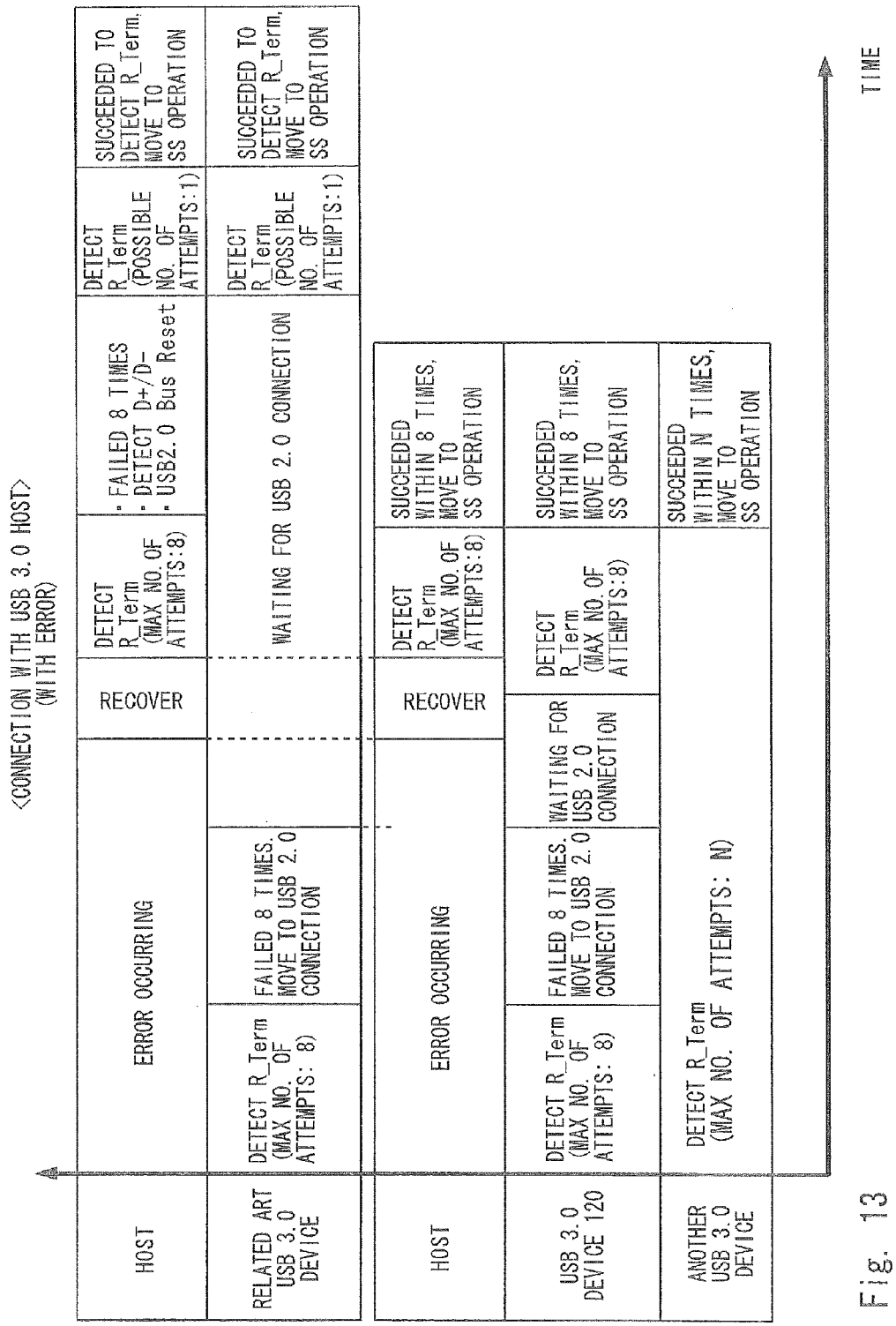
FIG. 13 shows a comparison with the another USB 3.0 device (3)
Figure 17:
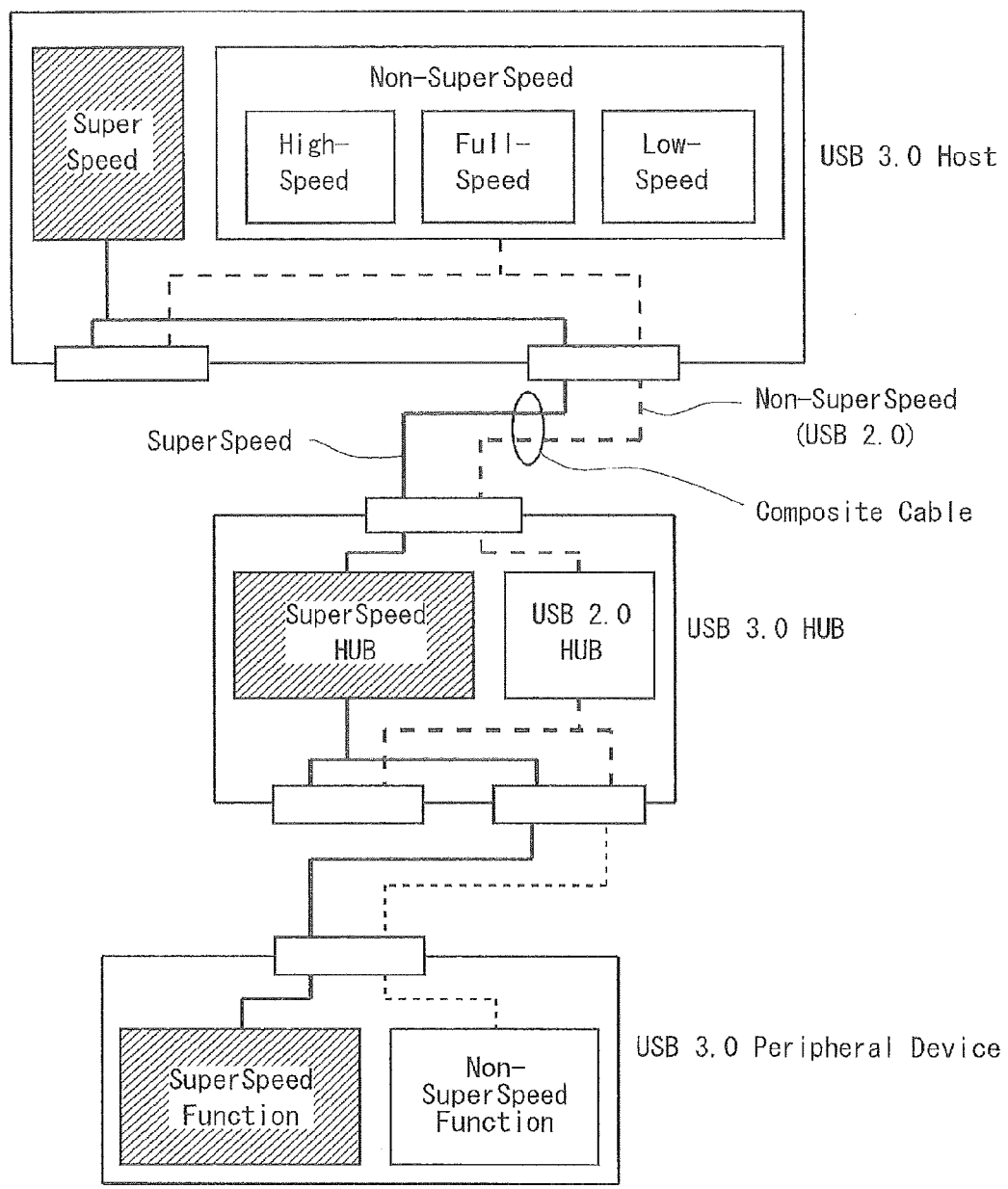
FIG. 17 shows a topology of USB 3.0.
Figure 18:
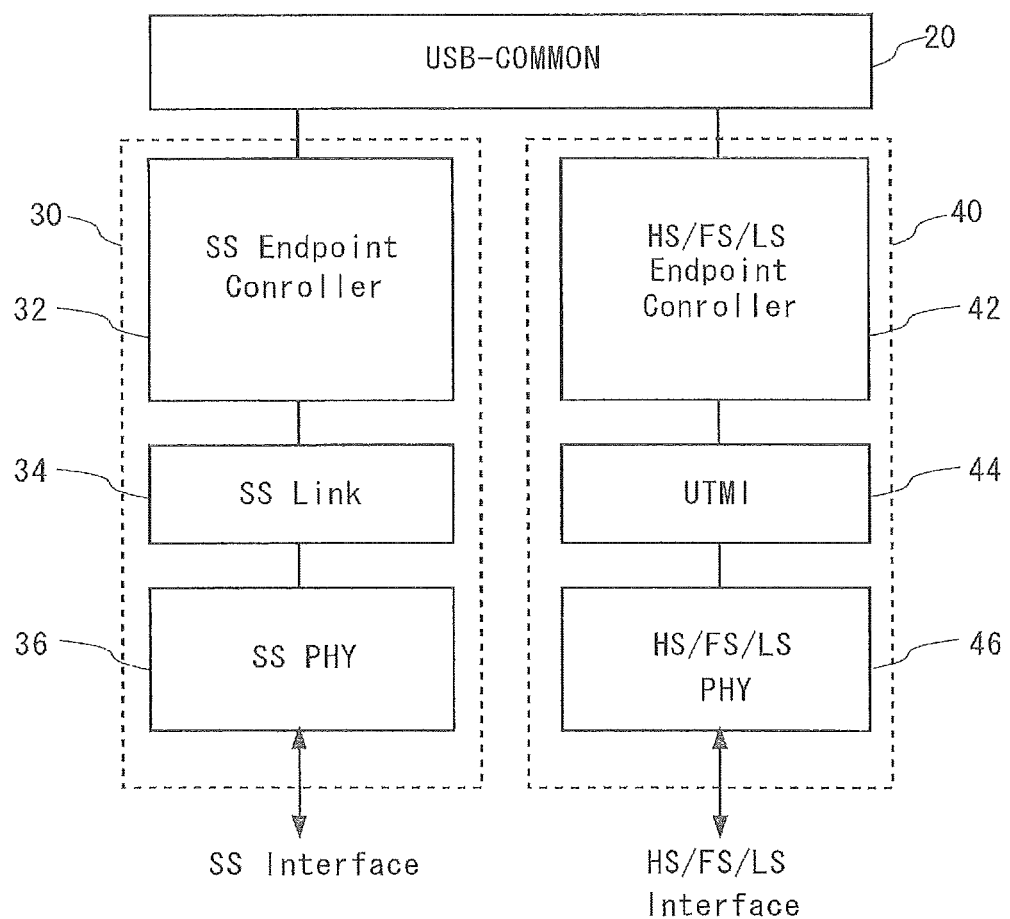
FIG. 18 is a hierarchical model diagram of a USB 3.0 apparatus.
Figure 19:
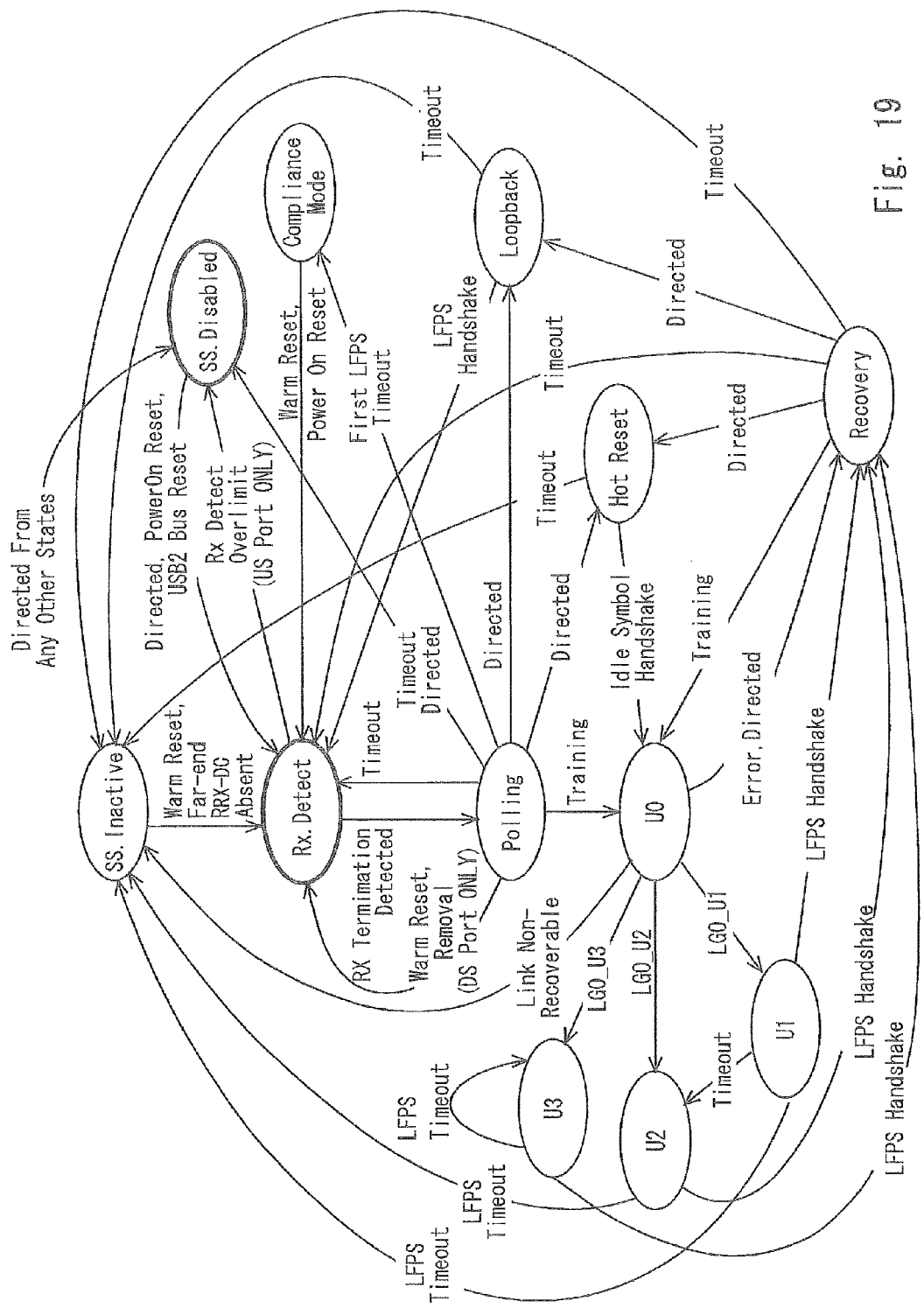
FIG. 19 shows LTSSM state transitions defined by USB 3.0.
Figure 20:
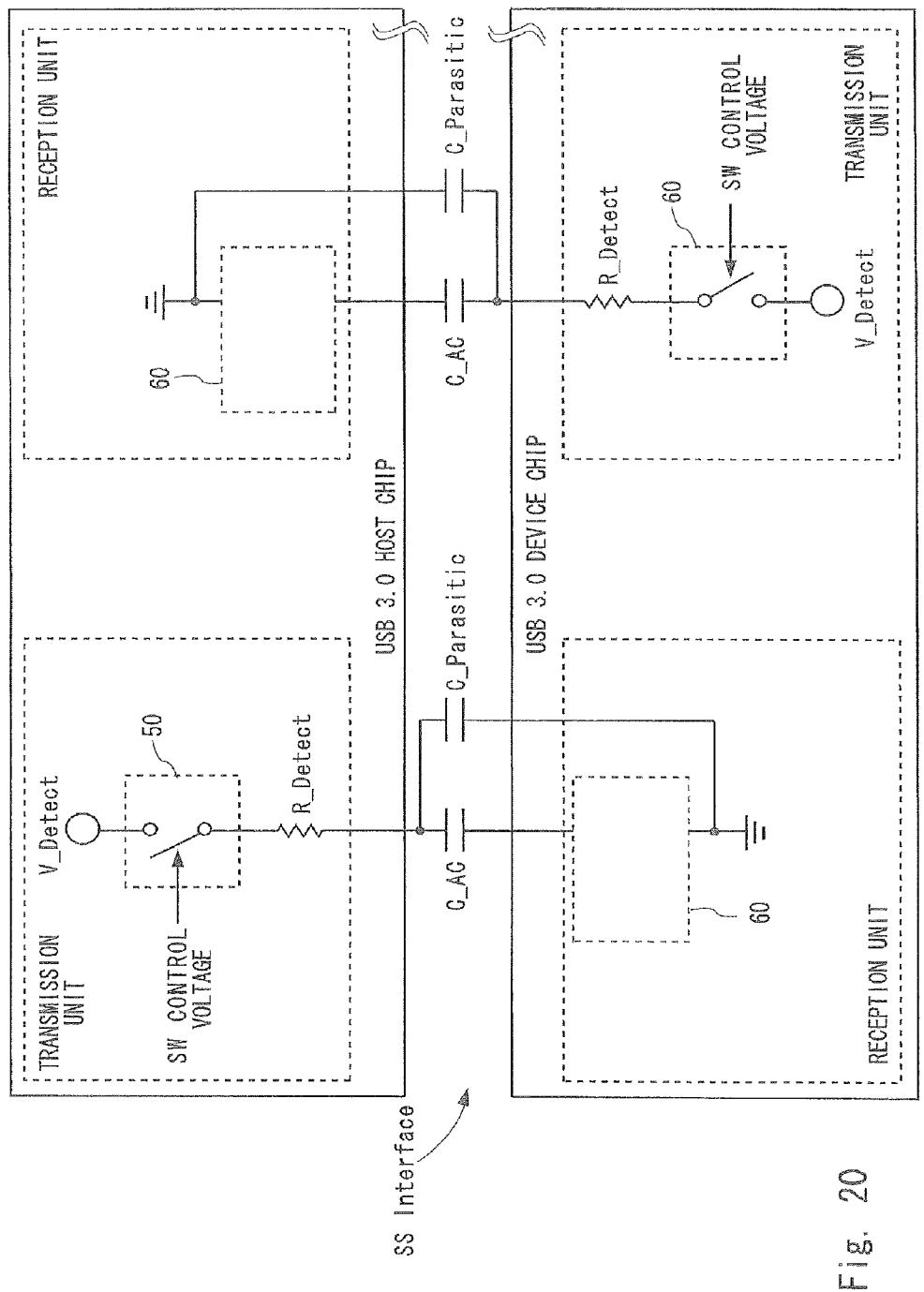
FIG. 20 is a diagram for explaining a mechanism of Receiver Detection performed in an Rx.Detect state (1)
Figure 21:
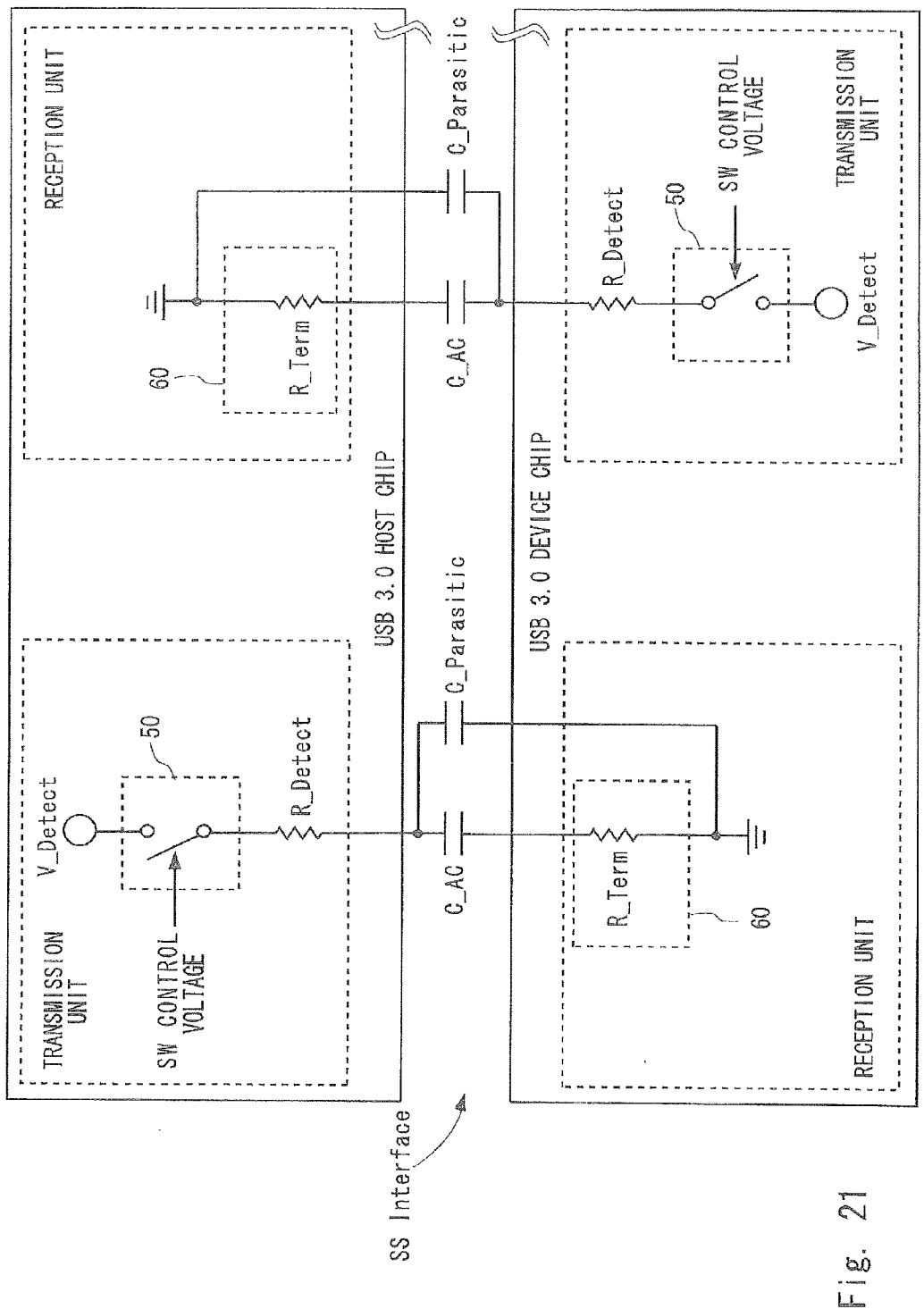
FIG. 21 is a diagram for explaining a mechanism of the Receiver Detection performed in the Rx.Detect state (2)
Figure 22:
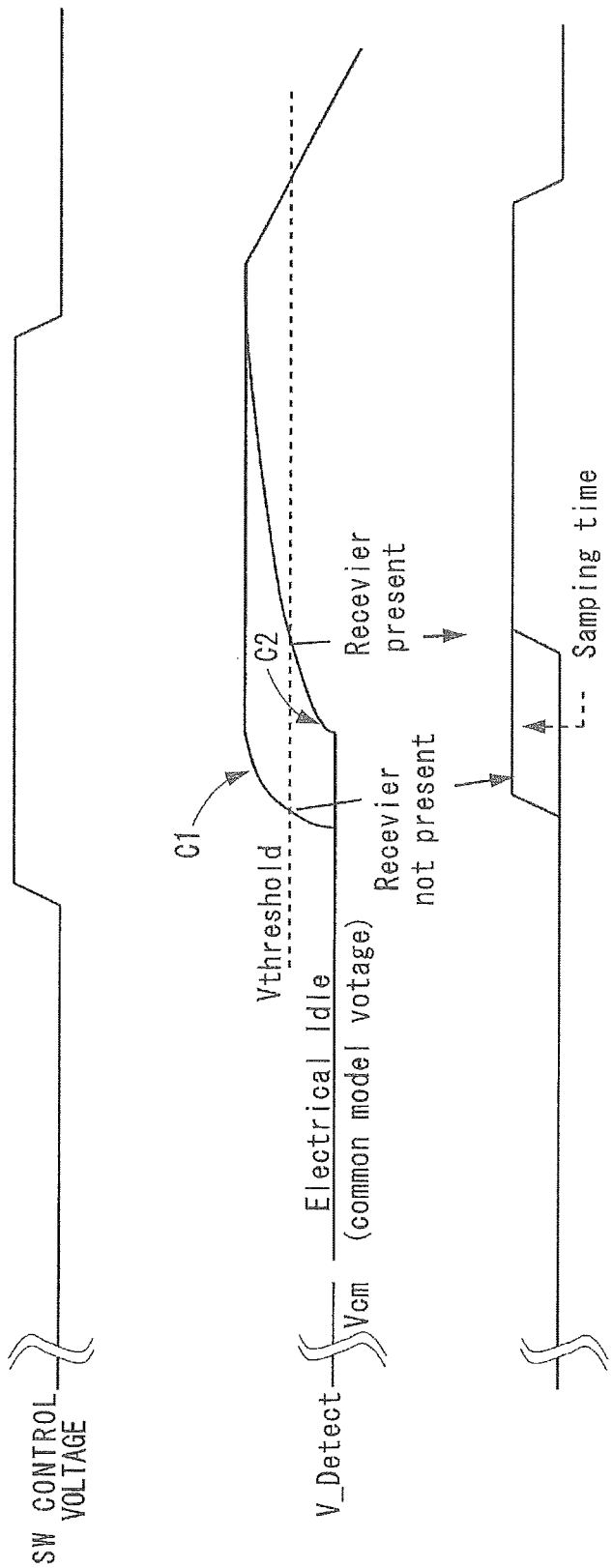
FIG. 22 is a diagram for explaining detection of Rx.Termination in the Receiver Detection.

FIG. 13 is a diagram further showing an operation of the another USB 3.0 device in addition to FIG. 7, i.e., FIG. 13 shows operations of the USB 3.0 device 120, the USB 3.0 device according to the related art, and the another USB 3.0 device when the USB host 110 is the USB 3.0 host and further, after the device transitioned to the SS.Disabled state due to an error in the host in the first Receiver Detection, the device recovers from the error.

In this case, as shown in the drawing, the establishment of the SS connection is faster for both the USB 3.0 device 120 and the another USB 3.0 device than for the USB 3.0 device according to the related art.

Explained below is a comparison of the time taken from the start of the Receiver Detection till the establishment of the USB 2.0 or the SS connection among the USB 3.0 device 120, the USB 3.0 device according to the related art, and the another USB 3.0 device for each case shown in FIGS. 11 to 13.

FIG. 14 further shows the time till the establishment of the USB 2.0 connection in the case of the another USB 3.0 device in addition to FIG. 8. As shown in the drawing, the time till the establishment of the USB 2.0 connection is similar between the USB 3.0 device 120 and the USB 3.0 device according to the related art, however the time till the establishment of the USB 2.0 connection is longer for the another USB 3.0 device.

FIG. 15 further shows the time till the establishment of the SS connection in the case of the another USB 3.0 device in addition to FIG. 9. As shown in the drawing, the time till the establishment of the SS connection is similar among all of the USB 3.0 device 120, the USB 3.0 device according to the related art, and the another USB 3.0 device.

FIG. 16 further shows the time till the establishment of the SS connection in the case of the another USB 3.0 device in addition to FIG. 10. As shown in the drawing, the time till the establishment of the SS connection is shorter for both the USB 3.0 device 120 and the another USB 3.0 device than for the USB 3.0 device according to the related art.

That is, when the device was unable to detect the Rx.Termination due to an error in the USB 3.0 host within eight times of detection, which is the maximum number of detection defined by USB 3.0, both the USB 3.0 device and the another USB 3.0 device can achieve the establishment of the SS connection faster than the USB 3.0 device according to the related art. However, there is a problem in the another USB 3.0 device that the when the host is the USB 2.0, the another USB 3.0 device is delayed to establish the USB 2.0 connection.

Although USB 3.0 standard is defined, under the present circumstances where hosts exist that do not comply with the standard, the USB 3.0 device 120 in the USB system 100 of this embodiment can produce larger advantages.

For example, there are USB 3.0 hubs not complying with the standard among USB 3.0 devices manufactured by well-known USB device manufacturers. With such a USB 3.0 hub, an error is generated during execution of the Receiver Detection as a host, and even after the USB 3.0 hub recovers from the error and attempts to execute the Receiver Detection, the USB 3.0 hub will not execute the USB 2.0 Bus Reset.

In the case of such a USB 3.0 hub, the USB 3.0 device according to the related art will have no chance to return to the Rx.Detect state, thus neither the SS connection nor the USB 2.0 connection were unable to be established. As long as there is no artificial operation such as insertion or removal of a USB cable, the connection between the host and the device is not established, and this will naturally disable the communication.

Such a problem is generated because the above USB 3.0 hub operates in compliant with the standard, thus this problem should be actually solved by the such manufacturers. However, when such manufactures gain certain shares in the USB device market, it is unreasonable but the manufacturers of the USB 3.0 devices are required to deal with the problem even if those USB 3.0 hubs are not compliant with the standard.

When the abovementioned another USB 3.0 device enters the SS.Disabled state once, the USB 3.0 device is unable to return to the Rx.Detect state unless the USB 3.0 Bus Reset is executed. This, when the above USB 3.0 hub has not recovered from an error while the USB 3.0 device attempts to detect the Rx.Termination for N times, in a similar manner to the USB 3.0 device according to the related art, the connection between the host and the device is not established unless there is no artificial operation such as insertion or removal of a USB cable, thereby naturally disabling the communication.

Meanwhile, the control unit 200 in the USB system 100 according to this embodiment voluntarily returns to the Rx.Detect state in the case where the USB 2.0 Bus Reset is not generated when the time T elapses after entering to the SS.Disabled state. Thus, it is possible to establish the SS connection after recovering from the error in the USB 3.0 hub even with the abovementioned USB 3.0 hub.

While the invention has been described in terms of embodiments, those skilled in the art will recognize that the invention can be practiced with various modifications within the spirit and scope of the appended claims and the invention is not limited to the examples described above.

Further, the scope of the claims is not limited by the embodiments described above. Furthermore, it is noted that, Applicant's intent is to encompass equivalents of all claim elements, even if amended later during prosecution.

What is claimed is:

1. A control method for a USB 3.0 (USB: Universal Serial Bus) device comprising:
    controlling the USB 3.0 device that has entered an SS.Disabled state to transition to an Rx.Detect state when a USB 2.0 connection is not established with a USB host even after a predetermined time, the USB 2.0 connection comprising any one of an HS (High Speed) connection, an FS (Full Speed) connection, and an LS (Low Speed) connection.

2. A USB 3.0 (USB: Universal Serial Bus) device comprising:
    a control unit that controls the US 3.0 device that has entered an SS.Disabled state to transition to an Rx.Detect state when a USB 2.0 connection is not established with a USB host after a predetermined time, the USB 2.0 connection comprising one of an HS (High Speed) connection, an FS (Full Speed) connection, and an LS (Low Speed) connection.

3. The USB 3.0 device according to claim 2, further comprising:
    a USB 2.0 connection unit that performs a connection procedure for the USB 2.0 connection; and
    an SS connection unit that performs a connection procedure for an SS (Super Speed) connection, wherein
    the control unit comprises a timer that counts time from when the USB 3.0 device enters the SS.Disabled state, controls the SS connection unit to stop operating and also controls the USB 2.0 connection unit to start the connection procedure when Receiver Detection performed by the SS connection unit fails in the Rx.Detect state, so that the USB 3.0 device transitions to the SS.Disabled state, and controls the SS connection unit to start the Receiver Detection when the USB 2.0 connection is not established by the USB 2.0 connection unit even after the time counted by the timer elapses in the SS.Disabled state, so that the USB 3.0 device transitions to the Rx.Detect state.

4. A control method for a USB 3.0 (USB: Universal Serial Bus) device comprising:
    controlling the USB 3.0 device that has entered an SS.Disabled state to transition to an Rx.Detect state when a USB 2.0 connection is not established with a USB hub even after a predetermined time, the USB 2.0 connection comprising any one of an HS (High Speed) connection, an FS (Full Speed) connection, and an LS (Low Speed) connection.

5. A USB 3.0 (USB: Universal Serial Bus) device comprising:
    a control unit that controls the US 3.0 device that has entered an SS.Disabled state to transition to an Rx.Detect state when a USB 2.0 connection is not established with a USB hub after a predetermined time, the USB 2.0 connection comprising one of an HS (High Speed) connection, an FS (Full Speed) connection, and an LS (Low Speed) connection.

6. The USB 3.0 device according to claim 5, further comprising:
    a USB 2.0 connection unit that performs a connection procedure for the USB 2.0 connection; and an SS connection unit that performs a connection procedure for an SS (Super Speed) connection, wherein the control unit comprises a timer that counts time from when the USB 3.0 device enters the SS.Disabled state, controls the SS connection unit to stop operating and also controls the USB 2.0 connection unit to start the connection procedure when Receiver Detection performed by the SS connection unit fails in the Rx.Detect state, so that the USB 3.0 device transitions to the SS.Disabled state, and controls the SS connection unit to start the Receiver Detection when the USB 2.0 connection is not established by the USB 2.0 connection unit even after the time counted by the timer elapses in the SS.Disabled state, so that the USB 3.0 device transitions to the Rx.Detect state.

7. A control method for a USB 3.0 (USB: Universal Serial Bus) hub comprising:

controlling the USB 3.0 device that has entered an SS.Disabled state to transition to an Rx.Detect state when a USB 2.0 connection is not established with a USB host even after a predetermined time, the USB 2.0 connection comprising any one of an HS (High Speed) connection, an FS (Full Speed) connection, and an LS (Low Speed) connection.

8. A USB 3.0 (USB: Universal Serial Bus) hub comprising:

a control unit that controls the US 3.0 device that has entered an SS.Disabled state to transition to an Rx.Detect state when a USB 2.0 connection is not established with a USB host after a predetermined time, the USB 2.0 connection comprising one of an HS (High Speed) connection, an FS (Full Speed) connection, and an LS (Low Speed) connection.

9. The USB 3.0 hub according to claim 8, further comprising:

a USB 2.0 connection unit that performs a connection procedure for the USB 2.0 connection; and an SS connection unit that performs a connection procedure for an SS (Super Speed) connection, wherein the control unit comprises a timer that counts time from when the USB 3.0 device enters the SS.Disabled state, controls the SS connection unit to stop operating and also controls the USB 2.0 connection unit to start the connection procedure when Receiver Detection performed by the SS connection unit fails in the Rx.Detect state, so that the USB 3.0 device transitions to the SS.Disabled state, and controls the SS connection unit to start the Receiver Detection when the USB 2.0 connection is not established by the USB 2.0 connection unit even after the time counted by the timer elapses in the SS.Disabled state, so that the USB 3.0 device transitions to the Rx.Detect state.

\* \* \* \* \*